United States Patent
Causey et al.

(10) Patent No.: US 8,892,036 B1
(45) Date of Patent: Nov. 18, 2014

(54) PROVIDING AN INDICATION OF A WIRELESS ACCESSORY STATUS

(75) Inventors: Mark Edward Causey, Tucker, GA (US); Scott Andrus, Prior Lake, MN (US); Adrianne B. Luu, Roswell, GA (US); Kevin W. Jones, St. Louis Park, MN (US)

(73) Assignee: AT&T Mobility II LLC, Atlanta, GA (US)

( * ) Notice: Subject to any disclaimer, the term of this patent is extended or adjusted under 35 U.S.C. 154(b) by 1200 days.

(21) Appl. No.: 11/924,140

(22) Filed: Oct. 25, 2007

(51) Int. Cl.
  *H04B 7/00* (2006.01)

(52) U.S. Cl.
  USPC .................... 455/41.2; 455/419; 455/569.1

(58) Field of Classification Search
  CPC ............. G01S 19/34; H04W 52/0229; H04W 52/0241; H04W 52/0277; Y02B 60/50
  USPC ........................................................ 455/41.2
  See application file for complete search history.

(56) References Cited

U.S. PATENT DOCUMENTS

| | | | |
|---|---|---|---|
| 5,748,084 A | 5/1998 | Isikoff | |
| 5,796,338 A | 8/1998 | Mardirossian | |
| 5,991,645 A * | 11/1999 | Yuen et al. | 455/575.2 |
| 6,154,665 A | 11/2000 | Briffett et al. | |
| 6,853,840 B2 | 2/2005 | Najafi | |
| 6,956,480 B2 | 10/2005 | Jespersen | |
| 7,664,463 B2 | 2/2010 | Ben Ayed | |
| 7,710,289 B2 | 5/2010 | Liu et al. | |
| 8,140,012 B1 | 3/2012 | Causey et al. | |
| 2001/0002211 A1 | 5/2001 | Lee | |
| 2001/0056305 A1 | 12/2001 | Moriya et al. | |
| 2003/0063003 A1 | 4/2003 | Bero et al. | |
| 2003/0083011 A1 * | 5/2003 | Haller et al. | 455/41 |
| 2004/0155777 A1 | 8/2004 | Mitchell et al. | |
| 2004/0259542 A1 * | 12/2004 | Viitamaki et al. | 455/426.2 |
| 2005/0037818 A1 * | 2/2005 | Seshadri et al. | 455/569.1 |
| 2005/0232190 A1 * | 10/2005 | Karaoguz et al. | 370/328 |
| 2006/0003700 A1 | 1/2006 | Yasuda et al. | |
| 2006/0019605 A1 * | 1/2006 | Shau | 455/66.1 |
| 2006/0025176 A1 * | 2/2006 | Llamas et al. | 455/557 |
| 2006/0105713 A1 * | 5/2006 | Zheng et al. | 455/41.2 |
| 2006/0105743 A1 | 5/2006 | Bocking et al. | |
| 2006/0109825 A1 * | 5/2006 | Abdel-Kader et al. | 370/338 |
| 2007/0030156 A1 | 2/2007 | Schlager et al. | |
| 2007/0080824 A1 | 4/2007 | Chen et al. | |
| 2007/0129113 A1 * | 6/2007 | Klicpera et al. | 455/567 |
| 2007/0224939 A1 * | 9/2007 | Jung et al. | 455/41.2 |
| 2007/0224980 A1 * | 9/2007 | Wakefield | 455/418 |
| 2007/0281660 A1 * | 12/2007 | Chon | 455/403 |

(Continued)

OTHER PUBLICATIONS

U.S. Appl. No. 13/401,897, filed Feb. 22, 2012, Causey et al.

*Primary Examiner* — Zhiyu Lu
(74) *Attorney, Agent, or Firm* — Baker & Hostetler LLP

(57) ABSTRACT

A communications device is configured to alert its user when the status of a wireless accessory meets certain conditions. In an example embodiment, when the wireless accessory is removed beyond the proximate area where the communications device is located, the communications device issues an alert to indicate that the communications device may be moving away from the wireless accessory or the wireless accessory may be moving away from the communications device. An exemplary situation includes the user of a mobile phone and a wireless headset accessory. In the example, the user keeps the mobile phone on his or her person. If the user puts down the wireless headset and walks away from the wireless headset, the mobile phone alerts the user.

13 Claims, 3 Drawing Sheets

(56) References Cited

U.S. PATENT DOCUMENTS

| | | | |
|---|---|---|---|
| 2008/0039138 A1* | 2/2008 | Teicher | 455/558 |
| 2008/0111698 A1* | 5/2008 | Atherton | 340/601 |
| 2008/0146161 A1* | 6/2008 | Bugenhagen | 455/67.11 |
| 2008/0153515 A1* | 6/2008 | Mock et al. | 455/456.5 |
| 2008/0305770 A1 | 12/2008 | Kasama | |
| 2009/0011796 A1 | 1/2009 | Ormson | |
| 2009/0058670 A1* | 3/2009 | Sweeney et al. | 340/686.1 |

* cited by examiner

PROVIDING AN INDICATION OF A WIRELESS ACCESSORY STATUS

TECHNICAL FIELD

The technical field generally relates to wireless devices. More specifically, the technical field relates to providing an indication of the status of a wireless accessory.

BACKGROUND

Many of today's electronic systems include devices that communicate with each other wirelessly. There are many problems associated with these wireless systems and the devices that are a part of these systems. One example of a problem with current devices is that wireless accessories are easily lost. It is not uncommon for a user to put down a wireless accessory and then leave the wireless accessory not realizing that the user no longer has the wireless accessory. In addition, a wireless accessory may fall off a user. For example, when a user carries a headset on a lanyard it may fall off the lanyard without the user noticing. Another example of a shortcoming of present systems is that it is easy to let the power run down on a wireless accessory. A wireless accessory may be powered by a battery. It is not uncommon for one using a wireless accessory to use the wireless accessory, and, although the user does not intend to use the wireless accessory further, forget to turn off the wireless accessory. Thus, even though the user knows he will not use the wireless accessory, he leaves it on and the battery drains down limiting future usage. An example situation includes a user of a BLUETOOTH® headset leaving the headset in his or her car at the end of the day without turning the headset off. Another problem is that wireless devices, due to their generally small size, may be easily stolen.

SUMMARY

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter.

A communications device (e.g., a mobile phone) is configured to alert its user when the status of a wireless accessory (e.g., a BLUETOOTH® headset) meets certain conditions. In order to determine the status of the wireless accessory, the communications device monitors a signal broadcast from the wireless accessory. The communications device can determine the status of the wireless accessory via various means, including the strength of the signal, activity of the signal, and/or inactivity of the signal, for example. In an example embodiment, when the wireless accessory is removed beyond the proximate area where the communications device is located, the communications device issues an alert to indicate that the communications device may be moving away from the wireless accessory or the wireless accessory may be moving away from the communications device. An exemplary situation includes a mobile phone user who has the mobile phone on his or her person. If the user puts down a wireless headset and walks away from it, the mobile phone alerts the user. In another example embodiment, when the wireless accessory has not been used for active communication within a specified period of time, the communications device issues an alert to indicate, for example, that the wireless accessory is drawing power, but is not being used.

BRIEF DESCRIPTION OF THE DRAWINGS

The foregoing and other objects, aspects and advantages of providing an indication of the status of a wireless accessory will be better understood from the following detailed description with reference to the drawings.

DETAILED DESCRIPTION OF ILLUSTRATIVE EMBODIMENTS

Figure 1:
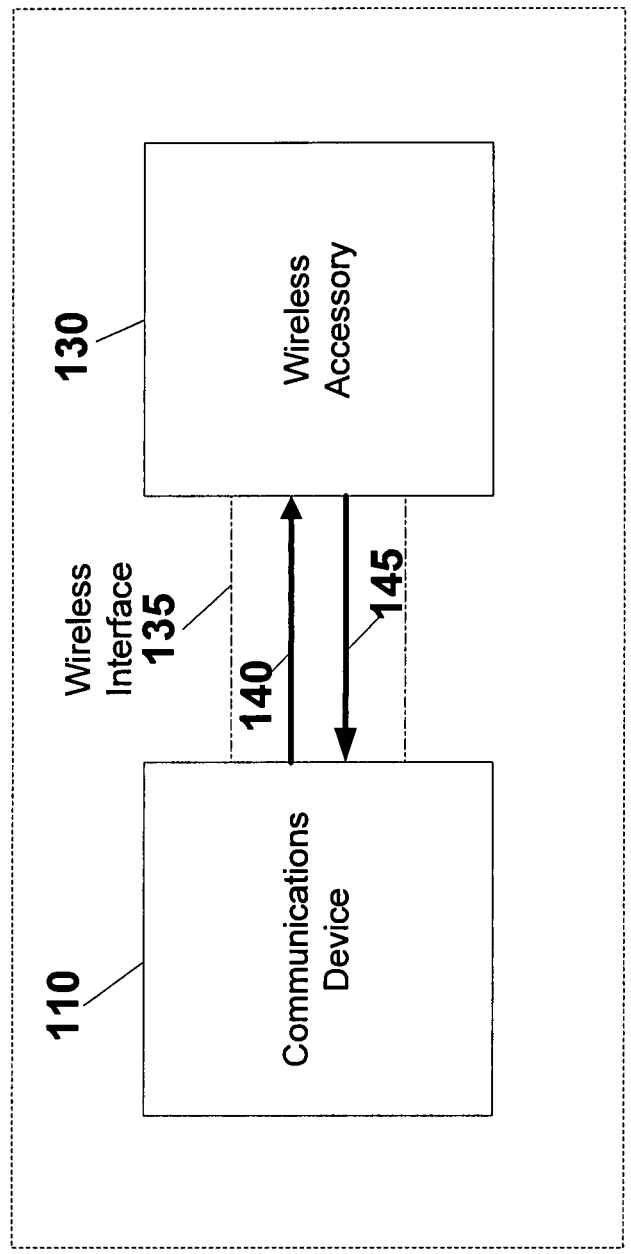
FIG. 1 is an illustration of an example system for providing an indication of a wireless accessory status.

FIG. 1 depicts a basic example communication system 100 with which an indication of the status of a wireless accessory can be provided. FIG. 1 depicts a communications device 110 that works with a wireless accessory 130. The communications device 110 can comprise any device having the ability to communicate wirelessly with a wireless accessory 130. Examples of a communications device 110 include a pager, PC, satellite phone, a television, a portable device, a variety of computing devices including (a) a portable media player, e.g., a portable music player, such as an MP3 player, a walkmans, etc., (b) a portable computing device, such as a laptop, a personal digital assistant ("PDA"), a portable phone, such as a cell phone or the like, a smart phone, a Session Initiation Protocol (SIP) phone, a video phone, a portable email device, a thin client, a portable gaming device, etc., (c) consumer electronic devices, such as TVs, DVD players, set top boxes, monitors, displays, etc., (d) a public computing device, such as a kiosk, an in-store music sampling device, an automated teller machine (ATM), a cash register, etc., (e) a navigation device whether portable or installed in-vehicle and/or (f) a non-conventional computing device, such as a kitchen appliance, a motor vehicle control (e.g., steering wheel), etc., or a combination thereof. The wireless accessory 130 can be any accessory that comprises the ability to interface wirelessly with the communications device 110. For example, the wireless accessory 130 can comprise a headset, video monitor, audio speaker, or the like. In an example embodiment, the communications device 110 comprises a BLUETOOTH® compatible mobile phone and the wireless accessory 130 comprises a BLUETOOTH® compatible headset. BLUETOOTH® is an industrial specification for wireless personal area networks (PANs). BLUETOOTH® provides a way to connect and exchange information between communications devices and accessories.

The communications device 110 and the wireless accessory 130 work together via a wireless interface 135 over which communication signals are sent wirelessly between the communications device 110 and the wireless accessory 130. The wireless interface 135 can comprise any appropriate type of interface, such as, for example, an optical interface, an infrared interface, an electromagnetic interface, a radio frequency (RF) interface, an acoustic interface, or a combination thereof. In an example configuration, the wireless interface 135 is a BLUETOOTH® conformant interface. In an example embodiment, the wireless accessory 130 transmits a wireless accessory signal 145 from which the communications device 110 can determine the status of the wireless accessory 130.

Figure 2:
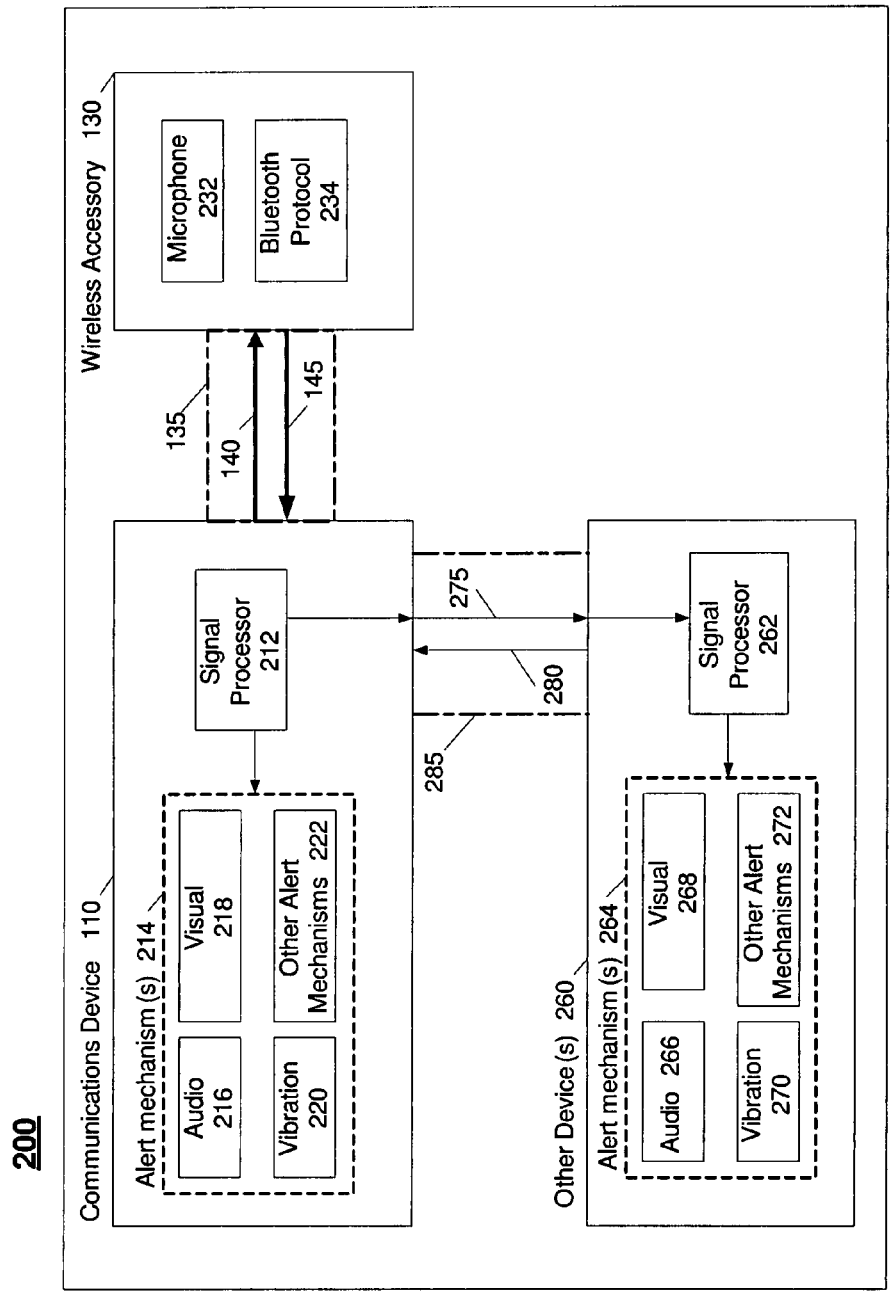
FIG. 2 is a detailed block diagram of an example system for providing an indication of a wireless accessory status.

FIG. 2 depicts a more detailed block diagram of an example system for providing an indication of a status of a wireless accessory. The wireless accessory 130 transmits the wireless accessory signal 145 to the communications device 110. The wireless accessory signal 145 may or may not be received by the communications device 110. If the communications device 110 receives the wireless accessory signal 145, the signal processor 212 analyzes the wireless accessory signal 145. Examples of status states for which the signal processor 212 tests include a minimum strength of the wireless accessory signal 145 and whether active communications are taking place (e.g., active communication is indicated by voice/video/data exchange between the wireless accessory 130 and communications device 110). As one example of this process, when using the wireless accessory 130 to communicate during a phone call, a user speaks into a microphone 232 of the wireless accessory 130. The wireless accessory 130 then sends the wireless accessory signal 145 to the communications device 110 wherein the wireless accessory signal 145 contains the audio information from the user of the wireless accessory 130. In one embodiment, the signal processor 212 analyzes this existing wireless accessory signal 145. Alternately, the wireless accessory 130 may be configured to transmit the wireless accessory signal 145, where the wireless accessory signal 145 is independent from other functions of the wireless accessory 130.

The signal processor 212 analyzes the wireless accessory signal 145 or detects the lack of reception of the wireless accessory signal 145. Based on predetermined conditions, the signal processor 212 determines the status of the wireless accessory 130 and what type of alert the communications device 110 should communicate (e.g., a normal alert or other alert). A normal alert is provided when the status of the wireless accessory 130 is normal. An abnormal alert is provided when the status of the wireless accessory 130 is abnormal.

An abnormal status describes a state where a predetermined condition, defined as abnormal, is met. As an example, a communications device 110 may be programmed to define an abnormal status as a state that needs the attention of a user. In one example embodiment, an abnormal status is defined as the state when the wireless accessory signal 145 indicates that the wireless accessory 130 may be moving away from the communications device 110. In the example embodiment, the communications device 110 renders an abnormal alert to communicate to the user that the wireless accessory 130 may be moving away from the communications device 110. A normal status is a status that communicates that none of the abnormal conditions for which the communications device 110 tests have been met.

In the example of FIG. 2, if after the signal processor 212 analyzes the wireless accessory signal 145 the wireless accessory signal 145 meets predetermined conditions, the signal processor 212 instructs the communications device 110 to render the indication of the status of the wireless accessory 130 via an alert mechanism(s) 214 that provides an appropriate alert message. Examples of ways to render alert message(s) include the following alert mechanism(s) 214, audio 216, visual 218, vibration 220, or other alert mechanisms 222.

In the expanded communications system environment 200 shown in FIG. 2, the communications device 110 can also communicate with other device(s) 260 (i.e., secondary communications devices). Communications between the communications device 110 and the other device(s) 260 takes place over an other device(s) interface 285 between the communications device 110 and the other device(s) 260. The other device(s) interface 285 may be connected to the communications device 110 and the other device(s) 260 by any method (e.g., a hard-wired connection, a wireless connection, or a combination of both a hard-wired connection and a wireless connection). In an example embodiment, the other device(s) interface 285 may be a network interface serving both the other device(s) 260, as well as the wireless accessory 130 and communications device 110. The communications device 110 sends communications to the other device(s) 260 via a signal 275 sent from the communications device 110 to the other device(s) 260.

If the communications device 110 is working with the other device(s) 260 as shown in FIG. 2, the signal processor 212 instructs the communications device 110 to send a signal 275 to the other device(s) 260 that conveys the status of the wireless accessory 130. Via the signal 275, the signal processor 212 can instruct the other device(s) 260 to communicate that everything is normal with the wireless accessory 130 (i.e., a normal alert) or can instruct the other device(s) 260 to communicate that abnormal conditions exist with the wireless accessory 130. When a normal condition exists, the signal processor 212 sends a signal 275 that instructs the other device(s) 260 to provide a normal alert. Alternately, a normal status can be inferred from the lack of an alert. When an abnormal condition exists, the signal processor 212 sends a signal 275 that instructs the other device(s) 260 to provide an abnormal alert specific to the status of the wireless accessory 130. The other device(s) 260 renders alerts per the instructions from the signal 275. Examples of ways to render alert message(s) include the following alert mechanism(s) 264, audio 266, visual 268, vibration 270, or other alert mechanisms 272.

Figure 3:
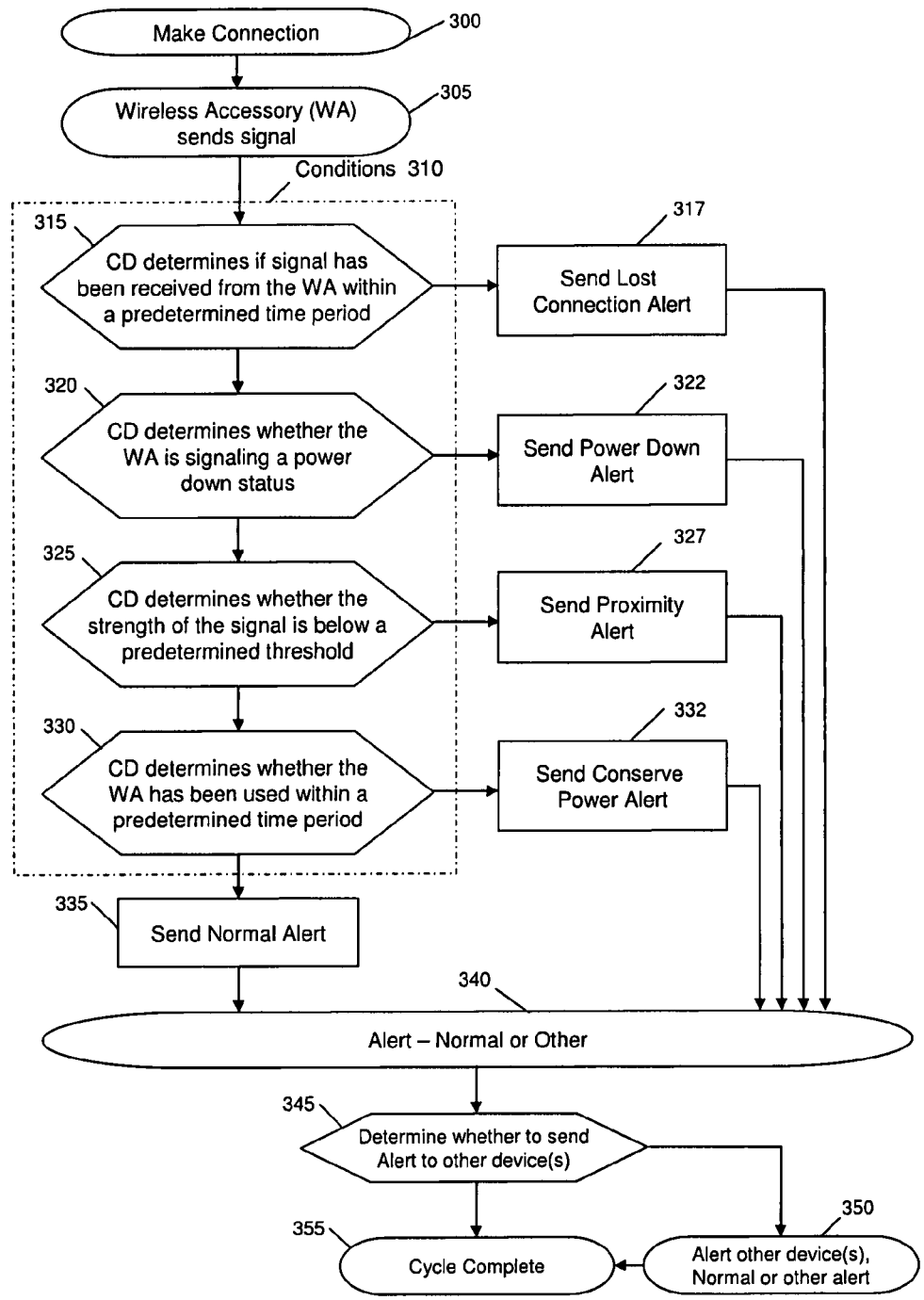
FIG. 3 is a flow diagram of an example process for indicating the status of a wireless accessory.

FIG. 3 is a flow diagram of an example process for indicating the status of a wireless accessory. It is to be understood that the number and sequence of steps depicted in FIG. 3 is exemplary and the process of providing an indication of a status of a wireless accessory is not limited thereto.

At step 300, a connection is established between a wireless accessory and a communications device (e.g., between the wireless accessory 130 and the communications device 110). The connection can be established at any appropriate time, such as when power is provided to the communications device and the wireless accessory. At step 305 of the method, a wireless accessory transmits a signal to a communications device. At step 310 of the method, a communications device determines whether the status of a wireless accessory meets certain conditions 310. In an example embodiment, the wireless accessory 130 transmits the wireless accessory signal 145 to the communications device 110 and the communications device 110 determines whether the status of the wireless accessory 130 meets the conditions 310. The flow diagram shows examples of conditions 310 for which a communications device may test at steps 315, 320, 325, and 330.

At step 315, the communications device determines the last time the communications device received the signal from the wireless accessory. If the communications device does not receive the signal within a defined time period, the communications device alerts the user of the communications device by sending a lost connection alert 317. The amount of time elapsed before the communications device sends a lost connection alert can be fixed or user defined. The lost connection alert 317 may contain information about the day and time the signal was lost. The lost connection alert 317 may also contain information about the location of the communications device at the point the signal was lost by the communications device.

If at step 315 the signal has not been lost, the process continues at step 320. At step 320, the communications device determines if the signal indicates that the wireless accessory is powering down. If the communications device detects a power down signal from the wireless accessory, the communications device alerts the user of the communications device by sending a power down alert 322. The power down alert 322 may contain information about the day and time the wireless accessory powered down. The power down alert 322 may also contain information about the location of the communications device at the point the wireless accessory powered down.

If at step 320 the signal does not indicate that the wireless accessory is powering down, the process continues at step 325. At step 325, the communications device determines if the strength of the signal is below a defined strength. If the signal strength is below the defined strength, the communications device alerts the user of the communications device by sending a proximity alert 327. The proximity alert 327 may contain information about the day and time the proximity alert 327 was triggered. The proximity alert 327 may also contain information about the location of the communications device at the point the proximity alert 327 was triggered.

If at step 325 the signal strength is not below the defined strength, the process continues at step 330. At step 330, the communications device determines the last time that the signal indicated that the wireless accessory was used for active communications. If the wireless accessory has not been used for active communications within a defined period of time, the communications device alerts the user of the communications device by sending a conserve power alert 332. The conserve power alert 332 may contain information about the day and time the signal triggered the conserve power alert 332. The conserve power alert 332 may also contain information about the location of the wireless accessory at the point the signal triggered the conserve power alert 332.

If at step 330 the signal does not indicate a conserve power alert 332 is appropriate, the process continues at step 335. At step 335, the communications device sends a normal alert 335 that indicates the status of the wireless accessory is normal (i.e., none of the conditions 310 that define an abnormal status have been met). In an alternate embodiment, a normal status may be indicated by the lack of an alert.

At step 340, the communications device renders one or more alerts depending on whether the conditions 310 have been met, indicating an abnormal status, or whether the status is normal an indicated by step 335. The alerts may be rendered by any appropriate means and may be visually rendered, acoustically rendered, or mechanically rendered. In an example embodiment, when the strength of the wireless accessory signal 145 is below a certain threshold, the communications device 110 alerts the user(s) of the communications device 110 by sending a proximity alert 327. Examples of ways the proximity alert may be transmitted to the user(s) of the communications device 110 include transmitting a sound, displaying the words 'proximity alert' on a video display screen, causing the communications device 110 to vibrate, causing lights on the communications device 110 to flash, sending an email to the communications device 110, or any other appropriate means.

As shown at step 345, the communications device can also be configured to send alerts 340 to other device(s). If the communications device is not configured to send alerts 340 to other device(s), one cycle of the method is complete (i.e. cycle complete 355) and another cycle begins. If the communications device is configured to send alert(s) 340 to other device(s), the communications device transmits the current alert(s) 340 to the other device(s) at step 350. After the communications device transmits the alert(s) 340 to the other device(s), one cycle of the method is complete and another cycle begins.

FIG. 3 is exemplary and it is to be understood that the number and sequence of steps may vary. For example, the process can be simplified to go from step 305 to step 325 and then to either step 327 or 335, and finishing at step 340. This example process is shorter than the full process shown in FIG. 3, but is still a valid implementation of the process.

The underlying concepts of the example embodiments can be applied to any communications device or system capable of working with wireless accessories. The various techniques described herein can be implemented in connection with hardware or software or, where appropriate, with a combination of both. For example, the method of FIG. 3 can take the form of program code (i.e., instructions) embodied in tangible media, such as floppy diskettes, CD-ROMs, hard drives, or any other machine-readable storage medium, wherein, when the program code is loaded into and executed by a machine, such as a mobile phone, the machine becomes an apparatus for providing an indication of the status of a wireless accessory. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The methods and apparatus for providing an indication of the status between a communications device and its wireless accessory also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for providing an indication of the status between a communications device and its wireless accessory. When implemented on a general-purpose processor, the program code combines with the processor to provide a unique apparatus that operates to invoke the functionality of providing an indication of the status between a communications device and its wireless accessory. Additionally, any storage techniques used in connection with providing an indication of the status between a communications device and its wireless accessory can invariably be a combination of hardware and software.

While providing an indication of the status of a wireless accessory has been described in connection with the various embodiments of the various figures, it is to be understood that other similar embodiments can be used or modifications and additions can be made to the described embodiments for performing the same function of providing an indication of the status of a wireless accessory without deviating therefrom. Therefore, providing an indication of the status of a wireless accessory should not be limited to any single embodiment, but rather should be construed in breadth and scope in accordance with the appended claims.

What is claimed is:

1. A method comprising:
receiving, by a communications device, a signal from a wireless accessory, the communications device and the wireless accessory being capable of voice exchange between the communications device and the wireless accessory, wherein the communications device and the wireless accessory comprise an acoustic interface for the communications device and the wireless accessory to communicate with each other via sound;

determining if a voice exchange is occurring between the wireless accessory and the communications device;

when it is determined that a voice exchange is not occurring between the wireless accessory and the communications device, determining if the signal has been received from the wireless accessory within a first predetermined time period;

upon a determination that the signal has not been received from the wireless accessory within the first predetermined time period, providing a lost connection alert;

upon a determination that the signal has been received from the wireless accessory within the first predetermined time period, determining whether the wireless accessory is signaling a power down status;

upon a determination that the wireless accessory is signaling a power down status, providing a power down alert;

upon a determination that the wireless accessory is not signaling a power down status, determining whether a strength of the signal is below a predetermined threshold;

upon a determination that the strength of the signal is below a predetermined threshold, providing a proximity alert;

upon a determination that the strength of the signal is not below a predetermined threshold, determining whether the wireless accessory has been used within a second predetermined time period;

upon a determination that the wireless accessory has not been used within the second predetermined time period, providing a conserve power alert; and upon a determination that the wireless accessory has been used within the second predetermined time period, providing a normal alert.

2. The method of claim 1, wherein the proximity alert indicates that the wireless accessory and the communications device are moving apart.

3. The method of claim 2, wherein the proximity alert includes sending an email to the communications device.

4. The method of claim 1, wherein:
the conserve power alert comprises:
an indication of day and time associated with determining whether the wireless accessory has been used within a second predetermined time period; and
a location of the wireless accessory at the day and time.

5. The method of claim 1, further comprising:
providing the normal alert to a plurality of communication devices.

6. The method of claim 1, further comprising:
transmitting at least one of the lost connection alert, the power down alert, the proximity alert, or the normal alert to a secondary communications device, wherein the transmission is a trigger for the secondary communications device to render the indication of the at least one of the lost connection alert, the power down alert, the proximity alert, or the normal alert.

7. A communications device comprising:
a processor; and
memory coupled to the processor, the memory have executable instructions stored thereon that when executed by the processor cause the processor to effectuate operations comprising:
receiving, by a communications device, a signal from a wireless accessory, the communications device and the wireless accessory being capable of voice exchange between the communications device and the wireless accessory, wherein the communications device and the wireless accessory comprise an acoustic interface for the communications device and the wireless accessory to communicate with each other via sound;

determining if a voice exchange is occurring between the wireless accessory and the communications device;

when it is determined that a voice exchange is not occurring between the wireless accessory and the communications device, determining if the signal has been received from the wireless accessory within a first predetermined time period;

upon a determination that the signal has not been received from the wireless accessory within the first predetermined time period, providing a lost connection alert;

upon a determination that the signal has been received from the wireless accessory within the first predetermined time period, determining whether the wireless accessory is signaling a power down status;

upon a determination that the wireless accessory is signaling a power down status, providing a power down alert;

upon a determination that the wireless accessory is not signaling a power down status, determining whether a strength of the signal is below a predetermined threshold;

upon a determination that the strength of the signal is below a predetermined threshold, providing a proximity alert;

upon a determination that the strength of the signal is not below a predetermined threshold, determining whether the wireless accessory has been used within a second predetermined time period;

upon a determination that the wireless accessory has not been used within the second predetermined time period, providing a conserve power alert; and upon a determination that the wireless accessory has been used within the second predetermined time period, providing a normal alert.

8. The communications device of claim 7, wherein the proximity alert indicates that the wireless accessory and the communications device are moving apart.

9. The communications device of claim 8, wherein the proximity alert includes sending an email to the communications device.

10. The communications device of claim 7, wherein:
the conserve power alert comprises:
an indication of day and time associated with determining whether the wireless accessory has been used within a second predetermined time period; and
a location of the wireless accessory at the day and time.

11. The communications device of claim 7, further comprising:
providing the normal alert to a plurality of communication devices.

12. The communications device of claim 7, the operations further comprising:
transmitting at least one of the lost connection alert, the power down alert, the proximity alert, or the normal alert to a secondary communications device, wherein the transmission is a trigger for the secondary communications device to render the indication of the at least one of the lost connection alert, the power down alert, the proximity alert, or the normal alert.

13. A computer-readable storage medium that is not a propagating signal, the computer-readable storage medium comprising executable instructions that when executed by a processor cause the processor to effectuate operations comprising:

receiving, by a communications device, a signal from a wireless accessory, the communications device and the wireless accessory being capable of voice exchange between the communications device and the wireless accessory, wherein the communications device and the wireless accessory comprise an acoustic interface for the communications device and the wireless accessory to communicate with each other via sound;

determining if a voice exchange is occurring between the wireless accessory and the communications device;

when it is determined that a voice exchange is not occurring between the wireless accessory and the communications device, determining if the signal has been received from the wireless accessory within a first predetermined time period;

upon a determination that the signal has not been received from the wireless accessory within the first predetermined time period, providing a lost connection alert;

upon a determination that the signal has been received from the wireless accessory within the first predetermined time period, determining whether the wireless accessory is signaling a power down status;

upon a determination that the wireless accessory is signaling a power down status, providing a power down alert;

upon a determination that the wireless accessory is not signaling a power down status, determining whether a strength of the signal is below a predetermined threshold;

upon a determination that the strength of the signal is below a predetermined threshold, providing a proximity alert;

upon a determination that the strength of the signal is not below a predetermined threshold, determining whether the wireless accessory has been used within a second predetermined time period;

upon a determination that the wireless accessory has not been used within the second predetermined time period, providing a conserve power alert; and upon a determination that the wireless accessory has been used within the second predetermined time period, providing a normal alert.

* * * * *